June 6, 1939.  A. F. OWEN  2,161,083
LAMINATED FIBER-RUBBER SHEET MATERIAL AND ARTICLES MADE THEREFROM
Filed March 18, 1936
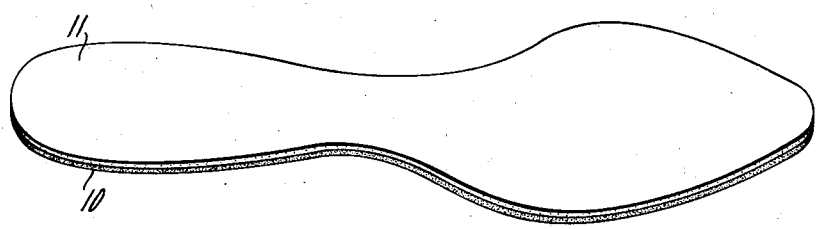
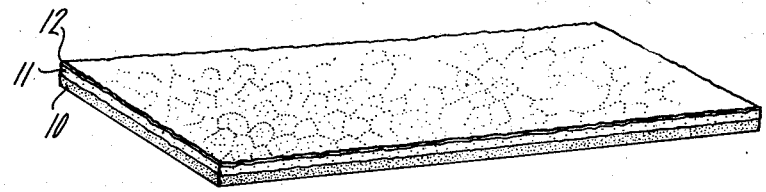
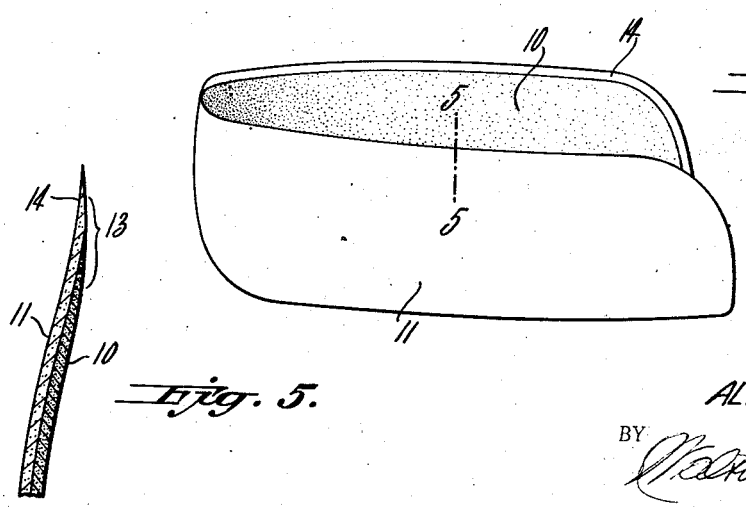
INVENTOR
ALLEN F. OWEN
BY
ATTORNEY Patented June 6, 1939

2,161,083

UNITED STATES PATENT OFFICE 2,161,083

LAMINATED FIBER-RUBBER SHEET MATERIAL AND ARTICLES MADE THEREFROM

Allen F. Owen, Beaver Falls, N. Y., assignor to Latex Fiber Industries, Inc., Beaver Falls, N. Y., a corporation of New York Application March 18, 1936, Serial No. 69,479

1 Claim. (Cl. 154—46)

This invention relates to laminated fiber-rubber sheet material and articles made therefrom. Fiber-rubber sheet material for use in the shoe industry as innersoles, midsoles, counters, box toes and the like, and in the artificial leather and floor covering industries as bases for coating with various types of paints and lacquers and embossing, if desired, are made at the present time primarily by two distinct processes utilizing rubber cements and aqueous dispersions of rubber. The first method generally comprises forming a loose web of fibrous material by interfelting fibers of the desired type on a machine of the paper making type, or utilizing a web or bat of fibers as from a carding machine, and impregnating such a web with rubber from an aqueous dispersion of rubber, or from an organic solvent solution of rubber or so-called rubber cement. Such a process is commonly called a "saturating" or "impregnating" process, and the product of such process a "saturated" or "impregnated" sheet. The second method of making such fiber-rubber products generally comprises adding an aqueous dispersion of rubber to a fiber furnish in a beater or head box or separate mixing device, coagulating the rubber on the fibers of the furnish, together with any sizing that may be present, as with aluminum sulphate, and then running the mixture off on a machine of the paper making type. This process is commonly called a "beater" or "beater type", and the product of such process a "beater" or "beater type" sheet. There have been other suggestions made for depositing the fibers and rubber from an aqueous suspension of fibers and dispersed rubber particles, but the "beater" method herein described is the one commonly used in forming fiber-rubber sheet material from an aqueous suspension of the fibers and dispersed rubber particles. The products of the "beater" process are generally made denser than the products of the "impregnating" process. "Impregnated" sheets have greater flexibility, greater initial tear, softer feel, and better cementing surface than "beater" sheets even of the same rubber content or density. The amounts of rubber and various filler materials in the products of these two processes may be varied almost at will. The utilization of each of these two types of material is limited by the disadvantages of each, while the many advantages of one or the other of these materials should naturally promote them into wide commercial use.

According to the present invention a new type of product has been evolved which combines to a great extent the advantages of both the "impregnated" sheet and the "beater" sheet and yet minimizes the disadvantages of each. The numerous advantages of the present invention will be clearly apparent from the following detailed description and the accompanying drawing, in which:

Fig. 1 is an end view of a fiber-rubber sheet according to the invention;

Fig. 2 is a perspective view of an inner sole made from the material of Fig. 1;

Fig. 3 illustrates one type of coated and embossed artificial leather material made from the fiber-rubber material of the present invention;

Fig. 4 is a perspective view of a shoe counter according to the present invention; and Fig. 5 is a section on the line 5—5 of Fig. 4.

In carrying out the present invention, laminated fiber-rubber sheet is formed by combining a sheet or layer of the deposit of fibers and rubber from an aqueous suspension of fibers and dispersed rubber particles, as by the "beater" process, with a sheet or layer of a rubber permeated fibrous web, such as a fibrous web impregnated with rubber from an aqueous dispersion of rubber or an organic solvent solution of rubber, as by the "impregnating" process. The term "combining" as used above refers to the adhering or securing together of the layers of the laminated sheet material with the aid of an adhesive material such as latex, glue, casein and the like. The expression "combining" is one used commonly in paper technology in this sense, and the layers may be made to adhere to one another by means of a separate "combining" machine commonly used in making laminated paper sheet material, or at one or the other of the machines for making the "beater type" sheet or the "impregnated" sheet. Various amounts of rubber may be introduced into the different layers or plies of the laminated fiber-rubber sheet and the amounts of rubber may or may not be appreciably different in the "beater type" layer and in the "impregnated" layer. In general, the amounts of rubber in these two types of plies will range from 10 to 90 parts, or more, by weight, per 100 parts of fiber. The "beater type" ply is preferably made appreciably denser than the ply of fibrous web permeated or impregnated with rubber and in general the "beater type" layer will be 15% to 100% denser than the "impregnated" layer. In this description of the improvement of the present invention, reference will be made more particularly to a laminated rubber-fiber sheet having only one "beater type" layer or ply, and one "impregnated" layer or ply, but it is obvious that for particular uses, as is described below, such laminated sheets may have more than one layer of either or both types of sheet material. Various types of fibers may be used in making both the "beater type" and the "impregnated" sheets which are used as layers in the laminated product of the present invention, just as these fibers may be used today in making the two types of sheets which are used alone. Wood fibers, such as sulphite, sulphate, or kraft pulps, or fibers of high alpha cellulose content, cotton fibers, such as cuttings or shearings, leather fibers, wool fibers, asbestos fibers, artificial fibers of reconstituted cellulose or of cellulose esters, and mixtures of the same, may be used.

The laminated fiber-rubber sheet of the present invention may be used for various purposes in the shoe industry as, for example, innersoles, midsoles, counters, box toes, and in the imitation leather industry where preferably the material is coated with a nitrocellulose or alkyd resin or similar lacquer and embossed as is well known in the art. As illustrations of specific compositions of fiber and rubber used in the different plies of laminated sheet material for various uses, the following examples of particular compositions for innersole stock and for imitation leather stock, are included. In each case the layer or ply of the "impregnated" sheet was of the following composition:

|  | Percent |
|---|---|
| Wood fiber (kraft pulp) | 62 |
| Rubber | 38 |

This layer of "impregnated" sheet was combined with a "beater type" sheet which for (1) innersole stock had the following composition:

|  | Percent |
|---|---|
| Wood fiber (sulphate pulp) | 78 |
| Rubber | 22 | and which for (2) imitation leather stock had the following composition:

|  | Percent |
|---|---|
| Cotton fibers (shirt cuttings) | 73 |
| Rubber | 25 |
| Rosin | 1 |
| Dye | 1 |

The density of the "impregnated" layer was 0.55 while the density of the "beater type" layer for the innersole stock was 0.785 and for the imitation leather stock was 0.75. The "impregnated" layer was made in the usual manner by passing a loose interfelted paper-like web of wood fibers which had been made on a paper making machine through a bath of rubber latex and drying in the usual manner of making such "impregnated" sheet materials. In case of the layers of "beater type" material, the latex was added to the fiber furnish in the beater, together with the rosin and dye when used for the imitation leather stock as shown in the above examples, the rubber, and rosin where added, were coagulated on the fibers in the beater by the addition of aluminum sulphate, and the mixture was run off on a continuous type paper making machine.

The laminated fiber-rubber sheet material of the present invention may be utilized in different ways to present various advantages. These are suggested below in the detailed description of the products illustrated in the drawing, but it is not intended that such description shall be by way of limitation, since the laminated sheet product of the invention is capable of a wide variety of uses.

Fig. 1 illustrates the laminated fiber-rubber sheet material of the present invention, which comprises a "beater type" sheet or layer 10 of the deposit of fibers and rubber from an aqueous dispersion of fibers and dispersed rubber particles, and an "impregnated" sheet or layer 11 comprising a rubber permeated fibrous web. These two layers are adhered together by means of an adhesive or cementing material such as latex, glue, casein or the like and may be combined in a combining machine as used commonly in the paper industry or in any other desired manner as discussed above. The fibers, as suggested heretofore in the specification, may be wood fibers, such as sulphite, kraft, sulphate, or fibers of high alpha cellulose content, cotton fibers, such as cuttings or shearings or other grades of cotton fibers, leather fibers, wool fibers, asbestos fibers, artificial fibers of reconstituted cellulose or cellulose esters fibers, or mixtures of these various fibers. As illustrated in the compositions disclosed above, various types of fibers will be used in the different layers or plies depending on the use to which the product is to be put.

Fig. 2 illustrates an inner sole made of the laminated fiber-rubber sheet material, the characters 10 and 11 referring to the same "beater-type" layer and "impregnated" layer as in Fig. 1. An "impregnated" sheet alone has good flexibility and has good cementing properties for securing an outsole thereto, which is of particular advantage in utilizing the sole in the so-called "Compo" process, but such impregnated sheet has the disadvantage of not being sufficiently dense to hold tacks while staple lasting. The "beater type" sheet alone has sufficient density to hold the tacks but does not have the flexibility and cementing surface desired in the product and inherent in the "impregnated" sheet. In utilizing this innersole product of the present invention, as illustrated in Fig. 2, the cementing to the midsole or outsole is done on the "impregnated" side 11, while the "beater type" layer 10 takes care of the tack holding feature. In addition, the "beater type" ply is capable of withstanding direct wear of the foot without the use of a sock lining which in general is necessary with an "impregnated" fiber-rubber sheet.

Fig. 3 illustrates an imitation leather material comprising a "beater type" layer 10 and the "impregnated" layer 11, the "impregnated" layer being coated with a finishing material such as nitrocellulose lacquer or pyroxylin and embossed with the desired grain effect as is well known in the art. The figure shows the embossing on the impregnated side. This has various advantages. The side opposite the embossed surface being the "beater type" layer and being appreciably denser than the embossed "impregnated" layer, will prevent the reflex of the grain from the embossing plate showing through the reverse side of the sheet as shown in the drawing. In some cases, as where the artificial leather material is to be utilized without a covering, as in brief case and note book cover manufacture, the surface 10 of the "beater" ply is coated and embossed exposing on the reverse side the "impregnated" layer which has a more pleasing appearance. The coating on the embossed "beater" side adequately hides the less pleasing appearance of the "beater" sheet. Whether the embossing is done on the denser "beater type" layer or on the "impregnated" layer, the inclusion of the higher density "beater" sheet or ply in connection with the softer type "impregnated" layer minimizes the usual loss in gauge through embossing that is encountered when a straight "impregnated" sheet is used.

As shown in Figs. 4 and 5, the laminated fiber-rubber product has particular advantages in the manufacture of shoe counters. Shoe counters must maintain the heel section of the shoe stiff and rigid and they must be skived along the upper margin to produce a tapered edge that is soft and flexible so that the outer edge of the counter will not cut through the shoe lining and rub the foot of the wearer. As shown in Figs. 4 and 5, the counter is made of the laminated fiber-rubber sheet material of the present invention having a layer 10 of "beater type" material and an impregnated fibrous web 11 adhered thereto. The denser "beater type" layer maintains the counter stiff and rigid as is necessary and it is at this denser "beater type" layer 10 that the counter is skived off along the margin as shown at 13 leaving a tapered edge 14 of the softer "impregnated" sheet as the outer edge of the counter. The counter shown in Figs. 4 and 5 has the "impregnated" layer on the outside with the skiving tapering from the inside "beater type" layer outward to the "impregnated" layer. If desired, of course, the beater type layer can form the outside of the counter with the "impregnated" layer on the inside, with the skiving tapering from the outside "beater type" layer inward to the "impregnated" layer.

Similar materials may be made with three plies instead of two, such as for example, with two outer plies of "beater" sheet and an inner ply of "saturated" sheet as for gaskets and body shims where tough wearing surfaces on the outer faces of the sheet and a resilient and compressible inner stratum are desired. A similar product may be utilized for welt inner soles, and for special purposes three-ply material with outer plies of "saturated" sheet and an inner ply of "beater" sheet may be produced.

As is well known, various types of aqueous dispersions of rubber can be used in making both the "beater type" sheet and the "impregnated" sheet and the expression "aqueous dispersion of rubber" as used in the specification and claim is intended to designate broadly coagulable dispersions of elastic materials, including artificial dispersions of rubber or rubber-like materials, as well as natural latex, which may be preserved or compounded or otherwise treated as desired and which may be in a normal, diluted, concentrated or purified condition produced by methods known in the art.

While specific embodiments of the invention have been described, it is obvious that numerous modifications may be made therein and it is not desired to limit the invention otherwise than as set forth in the appended claim.

Having thus described my invention, what I claim and desire to protect by Letters Patent is:

A shoe counter composed of laminated sheet material comprising a layer of the deposit of fibers and rubber from an aqueous suspension of fibers and dispersed rubber particles, and a layer adhered to said first layer of a rubber impregnated fibrous web, said first layer being appreciably denser than said second layer, and said counter being skived off leaving a tapered edge of said second layer at said skived portions.

ALLEN F. OWEN.